US008551611B2

(12) United States Patent
Pichler

(10) Patent No.: US 8,551,611 B2
(45) Date of Patent: Oct. 8, 2013

(54) JOINT SEAL AND METHOD FOR THE PRODUCTION THEREOF

(76) Inventor: Gabriel Pichler, Berghausen (AT)

( * ) Notice: Subject to any disclaimer, the term of this patent is extended or adjusted under 35 U.S.C. 154(b) by 1316 days.

(21) Appl. No.: 11/722,147

(22) PCT Filed: Dec. 19, 2005

(86) PCT No.: PCT/EP2005/013687
§ 371 (c)(1),
(2), (4) Date: Jun. 19, 2007

(87) PCT Pub. No.: WO2006/066860
PCT Pub. Date: Jun. 29, 2006

(65) Prior Publication Data
US 2009/0091089 A1 Apr. 9, 2009

(30) Foreign Application Priority Data
Dec. 20, 2004 (EP) .................................... 04030180

(51) Int. Cl.
*B32B 27/08* (2006.01)
*E04B 1/682* (2006.01)

(52) U.S. Cl.
USPC .................. 428/319.3; 428/319.7; 428/314.4; 277/316; 521/155

(58) Field of Classification Search
USPC ..................... 428/318.4, 319.3, 319.7, 314.4; 277/316; 521/155
See application file for complete search history.

(56) References Cited

U.S. PATENT DOCUMENTS

| | | | | | |
|---|---|---|---|---|---|
| 3,985,688 | A * | 10/1976 | Speech | ......................... | 521/159 |
| 4,245,055 | A * | 1/1981 | Smith | ........................... | 521/140 |
| 4,275,172 | A * | 6/1981 | Barth et al. | ................... | 521/112 |
| 4,683,693 | A * | 8/1987 | Rockar et al. | ................... | 52/198 |
| 5,227,434 | A * | 7/1993 | Katz | ............................ | 525/419 |
| 6,997,640 | B1 * | 2/2006 | Hohmann, Jr. | .................. | 404/67 |
| 2003/0105261 | A1 * | 6/2003 | Komitsu et al. | ................. | 528/10 |
| 2004/0035075 | A1 * | 2/2004 | Trout | ............................. | 52/571 |

FOREIGN PATENT DOCUMENTS

| | | | |
|---|---|---|---|
| DE | 197 25 705 | A1 | 1/1999 |
| EP | 587453 | A2 * | 3/1994 |
| FR | 2 045 283 | A | 2/1971 |
| GB | 2 110 282 | A | 6/1983 |

OTHER PUBLICATIONS

International Search Report of International Application No. PCT/EP2005/013687.

* cited by examiner

*Primary Examiner* — Hai Vo
(74) *Attorney, Agent, or Firm* — Roberts Mlotkowski Safran & Cole, P.C.; David S. Safran

(57) ABSTRACT

The present invention relates to a joint seal for sealing a component joint, which comprises an insulation material in an internal joint area and a sealing material in at least one front-side joint edge area. The insulation material comprises a single-component, moisture cross-linking, elastic polymer foam and the sealing material is a sealant which is vapor-diffusion tight, directly adjoins the insulation material, is single-component, moisture cross-linking, and sprayable before the curing, as well as having an elasticity which is essentially equal to or greater than that of the insulation material. Furthermore, a method for producing the joint seal is described.

10 Claims, 3 Drawing Sheets

Figure 7:
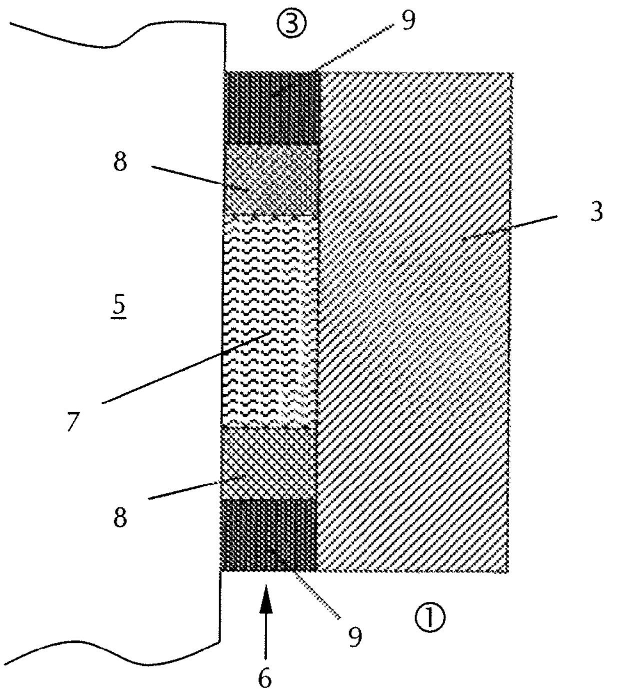
Fig. 7 (Prior Art)

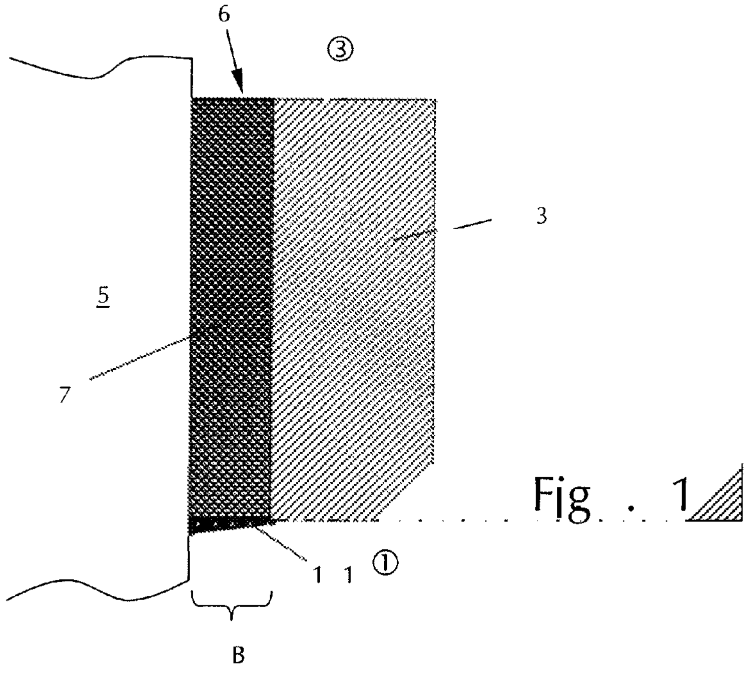
Fig. 1
Fig. 2
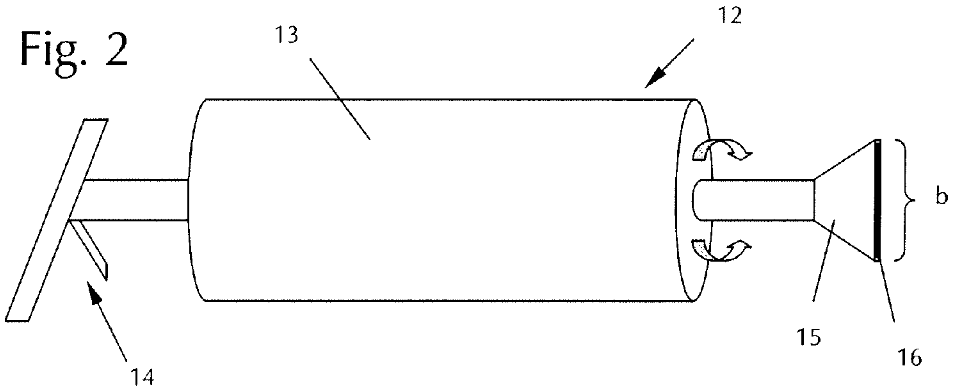
Fig. 3
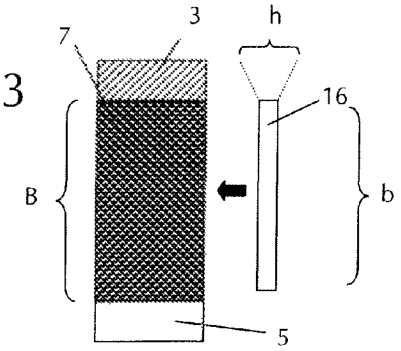
Fig. 4
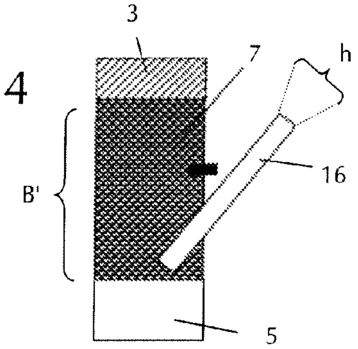

Fig. 5
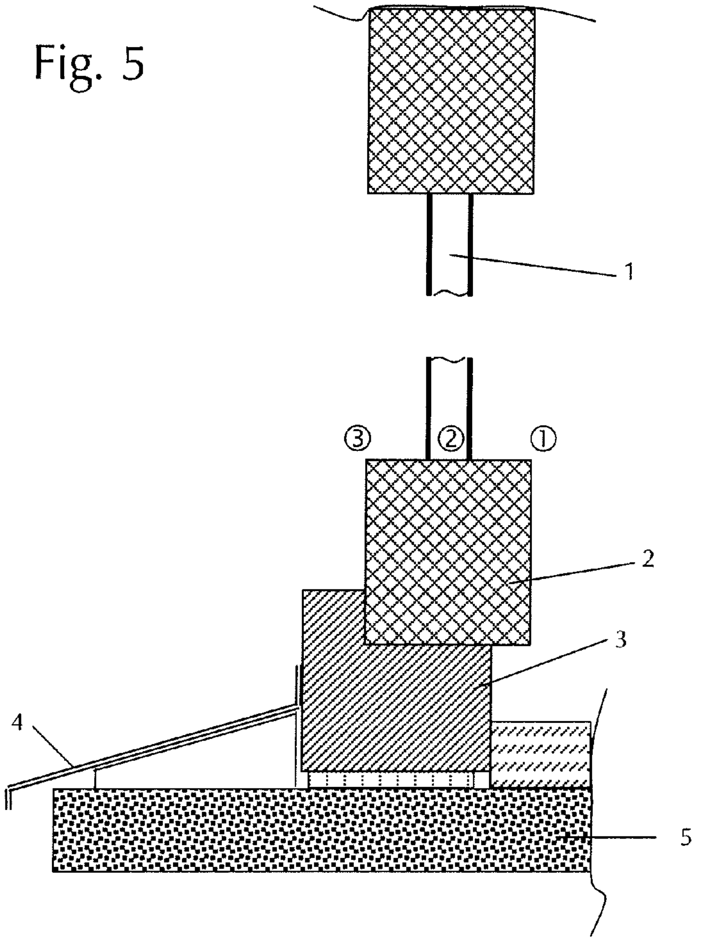
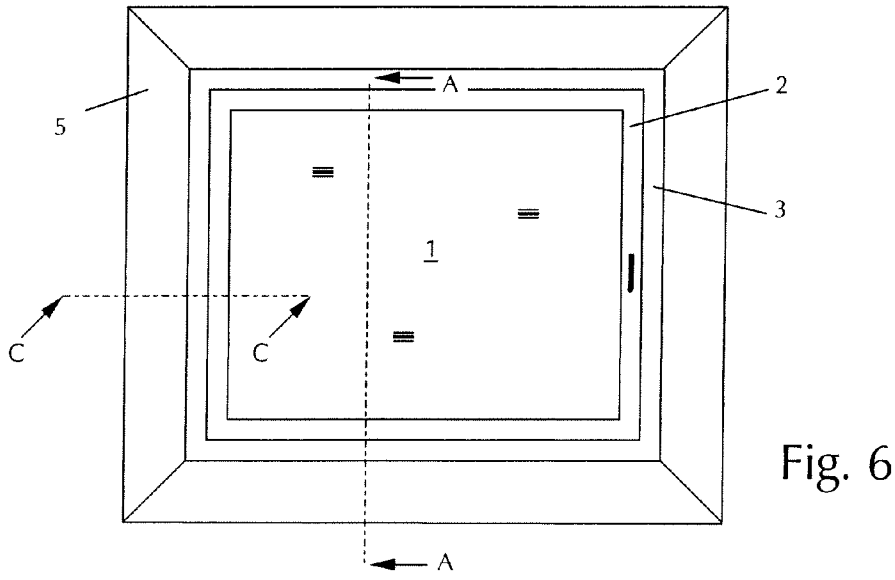
Fig. 6

JOINT SEAL AND METHOD FOR THE PRODUCTION THEREOF

The present invention relates to a joint seal for sealing a component joint, which has an insulation material in an internal joint area and a sealing material in at least one front-side joint edge area. A joint seal constructed in this way is frequently used in the field of construction, for example, for sealing cracks in a structural body, for attaching finished components to one another, or for attaching components to a structural body. In particular, the present invention relates to the attachment of door or window frames and roller shutter boxes to door or window openings of the structural body.

In recent years, the requirements for the heat and noise protection in buildings have become greater and greater in the scope of improved climate and environmental protection. An extensive separation of room climate and external climate is required when attaching windows and doors. The corresponding regulations for heat protection are given, for example, in standard DIN V 4108. In addition, guidelines for correct installation of windows are found in "Leitfaden zur Montage [Manual for Mounting]" from RAL-Guetegemeinschaft, Frankfurt am Main, 2000.

When judging weather and to what extent a window in the structural body sufficiently withstands the environmental influences, the so-called planar model is frequently used. This will be explained in greater detail on the basis of FIG. 5. A cross-section along line A-A in FIG. 6, which is in turn a top view of a window mounted in a structural body opening, is shown in very schematic form. Only the lower connection area is shown in FIG. 5, while the upper area above the window frame 2, which includes a glass pane 1, is not shown. The connection to the structural body 5 occurs via the frame 3, which is fitted in the window opening in the structural body 5. The exterior side is located on the left in FIG. 5, where the external window sill 4 is situated, the interior room side is correspondingly on the right in the figure.

The room-side area of window and surrounding structural body is identified by plane (1) for the planar model, and is responsible for the separation of room climate and external climate. Plane (3) identifies the exterior area of the window in the surrounding structural body and ensures the weather protection. The so-called functional area, which is to ensure the heat and noise protection above all and is identified here by (2), lies between the other two planes.

Plane (1) must be constructed in such a way that it is airtight on the room side over its entire area, to prevent moisture from penetrating into the interior of the construction from the room side and condensing out there. In contrast, it is only necessary for plane (3) that the entry of rain water from the exterior into the construction is largely prevented. Moisture which nonetheless penetrates must be able to diffuse back outward again if needed. The circumstance results from this that the overall system made of window, joint seal, and surrounding structural body must be constructed in such a way that it is tighter on the interior than on the exterior.

The attachment joint and its seal have decisive significance for implementing this requirement. For RAL mounting, i.e., window mounting in accordance with the "Leitfaden zur Montage [Manual for Mounting]" from RAL-Guetegemeinschaft and the relevant regulations according to DIN V 4108, EN 12207, EN 12208, etc., a multipart construction has proven itself for the attachment joint. All systems share the feature that initially the middle (interior) area of the attachment joint is filled with an insulation material. The insulation material is typically provided peripherally around the entire joint. Typically used insulation materials are rock wool, natural insulation materials such as natural fibers or cork, fill strips, or in-situ PUR foam. In general, neither a seal against moisture nor an airtight attachment is achieved using the insulation materials of the prior art. Rather, for this seal, sealing materials are provided in the joint external areas on both the room side and also the exterior side of the insulation material. To separate room climate and external climate in plane (1), the sealing material is applied peripherally over the entire length of the joint there. This is typically not the case on the exterior side (plane (3)), however. An area (for example, below an external window sill 4, which protects the attachment joint from the entry of driving rain) which is not filled up with sealing material is to allow the diffusion from moisture out of the joint to the outside.

Various systems are known as sealing materials in the prior art. These are primarily structural seal webs, impregnated foamed plastic strips, and sealants. The structural seal webs are films made of plastic, which are typically used in the external area and only for sealing windowsills or roller shutter boxes. The sealing materials will not be discussed in greater detail here.

Impregnated foamed plastic strips are impregnated sealing strips made of foam, which are commercially available in the precompressed state. After installation in the window joint, the precompressed strips expand and thus seal the joint.

Sealants are permanently elastic plastics which are typically injected into the joint and cure therein.

The attachment joint between window and structural body is a settlement joint which works. Accordingly, the sealant must be selected in such a way that it has sufficient movement absorption capability to be able to follow the expansions and contractions to which it is subjected during movements of the component joint, without tearing and becoming leaky. To prevent a so-called three-sided adhesion occurring in the sealant, a so-called backfill material is inserted between insulation material and sealant in the prior art. In this way, tearing or tearing off of the sealant because of the three-sided adhesion is to be prevented in the prior art. In general, a round cord made of polyethylene which is inserted in the component joint adjoining the insulation material is used as the backfill material. Subsequently, the sealant is injected into the component joint on the backfill material and smoothed to obtain a uniform and even surface.

Figure 8:
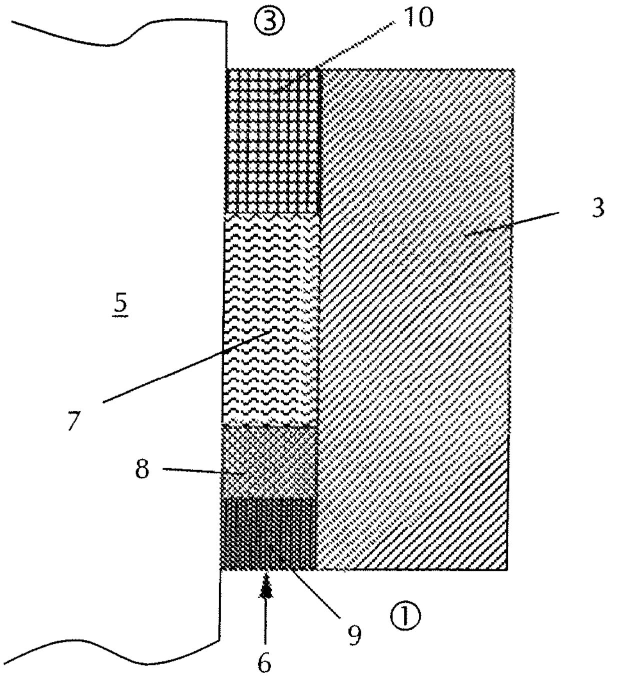
Fig. 8 (Prior Art)

The structure of joint seals, as they are particularly used when attaching windows and doors in the prior art, is schematically illustrated in FIGS. 7 and 8. In each case, the joint area between the window embrasure 5 and the window frame 3 is shown in the area of the section along line C-C in FIG. 6. In the case of FIG. 7, the joint seal 6 comprises an insulation material 7 situated in the interior of the joint, which is neither airtight nor tight to driving rain. This may be a predominantly open-cell polyurethane foam, for example, which only has a slight practical movement capability and may therefore only poorly follow movements of the component joint between frame 3 and embrasure 5. A round cord 8 made of polyethylene adjoins the insulation material on both the interior room side (plane (1)) and also on the weather side (plane (3)). This is used as a backfill material to prevent a three-sided adhesion of the sealant 9, which is injected into the front-side edge areas of the component joint. The sealant typically comprises silicone or polyacrylate. To meet the requirement of "interior tighter than exterior", a sealant 9 is used on the interior room side (1) which has a higher water vapor diffusion resistance than the sealant on the exterior side (3).

FIG. 8 shows a construction of a joint seal 6 of the prior art, which differs from that in FIG. 7 in regard to the weather-side seal (plane (3)). Instead of backfill material 8 and sealant 9, an impregnated foamed plastic strip 10 is provided in FIG. 8. In this way, the number of components in the joint seal 6 may be reduced in relation to that in FIG. 7. Precompressed sealing strips have the disadvantage, however, that they only result in sufficient tightness in a specific compression range. Therefore, they are intentionally manufactured by the producer for specific joint widths, so that different precompressed sealing strips must also be kept ready for different joint widths. It is also disadvantageous that precompressed sealing strips require smoothed counter surfaces and essentially constant joint widths over the entire joint length, so that a sufficient sealing effect may be achieved. This generally requires clean, plastered joints of uniform joint width over the joint length.

Similar problems as in the case of the precompressed sealing strips also arise with the polyethylene round cords used as backfill material. They may also not be used for any arbitrary joint width, but rather are each only usable for specific joint width ranges. Furthermore, the complicated construction of the joint seal from three different components is disadvantageous, which makes the production of the joint seal complex and time-consuming.

Therefore, there is a need for a joint seal, in particular for attaching windows and doors in a structural body, which does not have the above disadvantages. The joint seal is to comprise as few components as possible, is to be easily and rapidly producible, and is to be universally usable on greatly varying joint widths. It is nonetheless to fulfill the relevant standards and in particular the guidelines defined in Leitfaden zur Montage [Manual for Mounting]" from RAL-Guetegemeinschaft from the year 2000. Accordingly, the object of the present invention is to provide a joint seal of this type and a method for its production.

In its first aspect, the present invention relates to a joint seal for sealing a component joint which comprises an insulation material in an internal joint area and a sealing material in at least one front-side joint edge area. According to the present invention, the insulation material comprises a single-component, moisture cross-linked, elastic polymer foam. The sealing material is located directly adjoining the insulation material, and comprises a sealant which is single-component, moisture cross-linked, and sprayable before curing. It has an elasticity which is essentially equal to or greater than that of the insulation material.

In contrast to the joint seals from the prior art, which use a sprayable sealant, no backfill material is provided between insulation material and sealant in the joint seal according to the present invention. In the prior art, the backfill material—usually a polyethylene round cord—is used for the purpose of preventing a three-sided adhesion of the sealant in the joint. In contrast, in the present invention, the occurrence of cracks in the sealing material because of movements of the component joint is prevented by targeted selection of the properties of the sealant itself. According to the present invention, an elastic polymer foam is used as the insulation material, which absorbs and follows movements in the component joint because of its elasticity. Because the sealant is situated directly adjoining the insulation material according to the present invention, these movements are also transmitted to the sealant. However, according to the present invention, the sealant has an elasticity which at least corresponds to that of the insulation material or is greater. Preferably, the elasticity of the sealant is equalized to that of the insulation material as much as possible. Because of the tailoring of the elasticities, the sealant may follow the movements of the insulation material and those of the component joint, without cracks occurring in the sealant itself or tearing from the joint walls or from the insulation material occurring. The presence of a backfill material to prevent cracking is therefore no longer necessary. In this way, the construction of the joint seal may be significantly simplified in relation to the prior art.

A further advantage in the production of the joint seal according to the present invention is that the sealant is sprayable before it is cured. Furthermore, it is single component and moisture cross-linking. Therefore, for its application, it is only necessary to spray it onto the insulation material using a suitable applicator, such as a spray gun. This type of application is not only possible rapidly and easily, but rather also has the advantage that it is practical for greatly varying joint widths. In contrast to the case of precompressed sealing strips, a joint width which is uniform over the joint length is not necessary, nor does the joint have to be previously treated and smoothed.

The insulation material is preferably also injected into the joint, so that in the simplest variant of the joint seal according to the present invention, only two application procedures are necessary to obtain a joint seal which corresponds to the regulations according to DIN V 4108 and the guidelines of the RAL-Guetegemeinschaft, for example. This represents a significant simplification and cost savings in relation to the joint seals known up to this point.

Single-component, moisture cross-linking, elastic polymer foams which are known per se may be used as the insulation material. In principle, all elastic in-situ PUR foams, which have already been used up to this point for sealing window and door joints, are suitable. Polyurethane foams are especially suitable, although the present invention is not restricted to such foams, rather other polymer foams such as those based on silicone or acrylate are also conceivable. Most polymer foams used as in-situ PUR foams up to this point have low airtightness and tightness to driving rain. For this reason, their use is less preferable, because they have to be sealed on both joint front sides using sealing material to maintain standards DIN V 4108, EN 12207, EN 12208 and to maintain the RAL mounting guidelines. The joint seal thus has the construction: sealing material—insulation material—sealant.

In contrast, an especially simple construction of the joint seal according to the present invention is possible if the insulation material itself has a high tightness to driving rain and airtightness. For this reason, a polymer foam is preferably used which is airtight up to a pressure of at least 300 Pa in the testing of the airtightness according to the standards EN 12207 and EN 12208. An airtightness up to 600 Pa is especially preferred. In addition or alternatively thereto, the polymer foam preferably has a tightness to driving rain which ensures that no water entry occurs up to a testing pressure of at least 300 Pa and preferably up to 600 Pa according to the standards EN 1027 and EN 12208.

To achieve these properties, a predominantly closed-cell soft cell foam is preferably used. "Predominantly closed-cell" is to be understood here to mean that the proportion of closed cells (ASTM D-2856) is at least 50%. A closed cell proportion of at least 70% is preferred, 80% is especially preferred, and 90% is particularly preferred.

While most known in-situ PUR foams, as noted, have a relatively low elasticity, according to the present invention, those polymer foams which have a large practical movement capability are preferably used. Those polymer foams which have a practical elongation of at least 15% (DIN 53430) after their curing are especially suitable. Polymer foams having a practical elongation between 20 and 40% are especially expedient. Polymer foams having a breaking elongation (DIN 53430) of at least 15% are suitable. The breaking elongation (DIN 53430) is preferably at least 50% and especially preferably at least 70%.

In addition or alternatively to the cited properties, the polymer foam expediently has a thermal conductivity according to DIN 52612 of at most 0.1 W/mK in regard to sufficient thermal insulation. Values of at most 0.05 W/mK are especially preferred here.

A preferred polymer foam is a soft-cell polyurethane foam based on MDI (2,4' and/or 4,4'-diphenylmethane diisocyanate) and polyether polyol/polyester polyol. A polyurethane foam in which, in addition to a mixture of predominantly long-chain polyether polyol and short-chain polyether polyol, small quantities of a mixture of aliphatic and aromatic polyester polyol are also provided in the polyol components, is preferred. “Long-chain” is to be understood in particular as a number of at least 8 carbon atoms, “short-chain” is correspondingly fewer than 8 carbon atoms. From ecological aspects, those polymer foams are preferred which are essentially free of extractable organic halogen compounds and, for example, release less than 0.1 weight-percent, particularly less than 0.01 weight-percent, and preferably practically no (less than 0.001 weight-percent) organic halogen compounds at all.

As already noted, the sealant used in the joint seal according to the present invention is tailored in its elasticity in regard to the insulation material used. The way in which the elasticities of the two components are determined is arbitrary in principle, as long as comparable methods and method conditions are selected for both. Those sealants which have a Shore A hardness according to DIN 5305 in the range from 10 to 60 in the cured state are preferred. Those having a hardness according to Shore A of 10 to 40 are especially suitable, expediently 15 to 35. Alternatively or additionally to the cited Shore A hardness, the sealant has at least one of the following properties:

- an elongation at break of at least 200% and preferably at least 250%,
- a practical elongation according to DIN 53430 of at least 15%, preferably between 20 and 40%.

In regard to their chemical composition, in principle all single-component, moisture cross-linking sealants which are sprayable before curing, and which are compatible with the insulation material used and the materials to be joined, may be used. For reasons of environmental protection, the sealants used are essentially and preferably entirely free of organic solvents as much as possible. These are particularly to be understood as those volatile organic compounds which have a vapor pressure of at least 0.1 hPa at 20° C. and a boiling point of at most 260° C. at 1013.25 hPa. In particular, no halogenated solvents and propellants are preferably provided. “Essentially free” refers to a solid proportion in the sprayable, uncured sealant of at most 5 weight-percent.

So-called MS polymers have been proven to be especially suitable sealants, i.e., silyl-terminated polymers which cross-link under the influence of moisture. Among these, silane-modified polyethers are in turn especially suitable. Compounds of this type are described, for example, in DE 3816808 C1, DE 4019074 C1, DE 4119484 A1, DE 4210277 C2, DE 19502128 A1, DE 69511581 T2, DE 10130889 A1, and the publications cited therein. The silane-modified polyether prepolymer, which is the basis of the currently preferred sealant, is preferably acrylic-modified and particularly free of phthalates. An especially suitable sealing compound of this type is obtainable under the name Cosmosplast® MS 1696 from Weiss Chemie+Technik GmbH & Co. KG, Haiger, D E.

The sealant which is tight to vapor diffusion is particularly to be understood as a material which ensures sufficient water vapor diffusion tightness of the joint seal. The sealant accordingly expediently has a water vapor diffusion resistance index of at least 900, in particular at least 1000, and preferably at least 2000. Expressed as an Sd value, the diffusion resistance is expediently at least 1.8 m, preferably at least 2 m, and particularly at least 4 m at a layer thickness of 2 mm of the cured sealant.

The joint seal according to the present invention is capable of sealing multiple components and joints. Starting from the sealing of wall openings or other cavities, the application extends to sealing slabs and plaster supports up to filling attachment joints, for example, in wood construction and modular home construction. The joint seal according to the present invention is especially suitable for airtight sealing of construction attachment joints having high movement absorption. An especially preferred application is the attachment of door or window frames or a roller shutter box to a structural body. In this case, with the use of an insulation material sufficiently tight to driving rain and airtight, which has already been referred to, construction attachment joints may be produced with an extremely simple joint seal construction which fulfill the requirements for tightness to driving rain of class 9A according to standard EN 12208 and/or for airtightness of class 4 according to standard EN 12207. This is already achieved with a two-part construction of the joint seal.

Correspondingly, a construction of the joint seal according to the present invention in which sealant is only provided on one side of the insulation material, namely on the interior room side, is preferred. The sealant may be applied in such a way that it is at least partially still located inside the component joint. However, it is also possible that the insulation material completely fills up the component joint at least on the sealant side up to the joint edge and the sealant is applied to the front face of the insulation material and is thus located outside the component joint. This is also true for an application of the sealant on both sides. To provide a terminus on the interior room side which is tight to vapor diffusion and air, the sealant is expediently applied to the insulation material in such a way that it seals the component joint over its entire length and its entire width. The joint seal of this type fulfills the requirement “interior tighter than exterior” without further measures, because the sealant has a greater vapor diffusion resistance than the insulation material. Moisture possibly entering the component joint may therefore easily diffuse outward, toward the weather side. An additional seal of the weather side is not necessary, however, if the insulation material has sufficient airtightness and tightness to driving rain, as is preferred according to the present invention. It is then sufficient to cover or plaster the external joint in a way known per se.

However, also situating a sealing material on the exterior of the insulation material is not precluded. All sealing materials of the prior art, which have already been used up to this point at the corresponding point, come into consideration in principle. For example, the precompressed sealing strips already cited at the beginning may be noted. A sealant may also be used for the exterior seal. If its elasticity is tailored to that of the insulation material, as described, the backfill material may also be left out on this side. If a sealing material is also used on the exterior of the insulation material, it expediently has a lower vapor diffusion resistance than the sealing material of the interior, to allow diffusion of moisture outward. Moreover, the sealing material on the exterior is expediently not completely provided around the circumference of the entire joint length, as is already known in principle from the prior art.

Outstanding noise damping is achieved by the joint seal according to the present invention. According to DIN EN ISO 717-1, the maximum noise damping is at a value $R'_W$ of at least 55 dB and generally at least 60 dB, for example. At a joint width of 10 mm, a noise damping $R'_W$ of at least 52 dB and particularly at least 57 dB is achieved, at a joint width of 20 mm, a noise damping of at least 50 dB and particularly at least 55 dB is achieved.

In the following, a preferred method for producing a joint seal according to the present invention will be described in greater detail. Firstly, the internal joint area is foamed in a way known per se using the insulation material. Subsequently, excess insulation material must be removed by trimming if necessary and the surface must be evened. The sealant is then applied directly to the surface of the insulation material. If necessary, the sealant may subsequently be smoothed. After the curing of the sealant, the joint seal according to the present invention is already finished.

Before the application of the sealant, which is preferably performed in such a way that the sealant is pressed out of a cartridge or a hose bag with the aid of a spray gun, no pretreatment steps are necessary in principle. For example, it is not necessary to smooth the joint walls and to set the joint width to an essentially constant value, as is necessary when laying in a precompressed sealing strip. The application of a primer for adhesion mediating is also not necessary in principle, but is conceivable. However, it may be advisable to moisten the component joint to even out and accelerate the curing of the moisture cross-linking components. The moistening is performed either before the application of insulation material, after its application, before or after the application of the sealant, or at more than one of the cited times.

Because both the insulation material and also the sealant are expediently sprayed into the component joint, the joint seal and method according to the present invention are usable independently of the particular joint width occurring. The sealant may be applied especially effectively if the spray gun used is provided with a sheet die, through which the sealant is extruded. This sheet die expediently has a slot height which essentially corresponds to the desired layer thickness of the sealant layer. Suitable slot heights are between 0.5 and 5 mm, preferably between 1 and 3 mm. The slot width of the sheet die is expediently selected in such a way that it essentially corresponds to the maximum joint width to be sealed. Suitable joint widths are between 5 and 40 mm, preferably between 10 and 35 mm. A sheet die having a slot width of 30 mm, for example, is to be used for sealing a component joint having a maximum width of approximately 30 mm.

However, component joints having a lower width than that corresponding to the slot width of the sheet die may be sealed using the sealant. For this purpose, the sheet die is mounted so it is rotatable on the container which contains the sealant, for example. To obtain the maximum application width of the sealant, the sheet die is oriented transversely over the joint and essentially perpendicularly to the processing direction. If the width of the joint is less than the slot width of the sheet die, however, the latter is rotated on the container so that the slot comes to rest diagonally over the joint. Alternatively, with a sheet die connected fixed to the container, the container itself may be rotated in the cartridge holder. Greatly varying application widths may be set arbitrarily in accordance with the provided joint widths as a function of the angle of rotation of the sheet die.

After the application of the sealant, its surface may also be smoothed if necessary. For this purpose, a typical smoothing tool, such as a suitable spatula, may be used in way known per se, possibly in combination with a smoothing agent containing surfactant.

The present invention will be explained in greater detail in the following on the basis of drawings. In the drawings:

FIG. 1 schematically shows a joint seal according to the present invention in cross-section on the example of a window joint;

FIG. 2 schematically shows a spray gun for use in the method according to the present invention;

FIGS. 3 and 4 schematically show various setting possibilities of the sheet die of the spray gun according to FIG. 2 for setting different application widths for the sealant;

FIG. 5 schematically shows a window attachment in cross-section;

FIG. 6 schematically shows a top view of a window mounted in a structural body;

FIGS. 7 and 8 each schematically show a window joint seal of the prior art in cross-section.

Identical parts are provided with identical reference numerals in the figures.

FIG. 1 schematically shows the construction of a joint seal 6 according to the present invention in the example of a window joint. As in FIGS. 7 and 8, the cross-section along lines C-C in FIG. 6 is shown. The joint seal 6 is situated between the frame 3 of the window and the window embrasure 5 and attaches both components to one another. The joint seal 6 only comprises two components, namely the insulation material 7 and a sealant 11, which is situated directly on the insulation material 7 adjoining the interior room side (1) in the front-side joint edge area.

The insulation material 7 is a single-component, soft-cell polyurethane filler foam having high airtightness and high resistance to driving rain. It is injected with the aid of a spray gun into the interior joint area, expands there, and fills this joint area with foam. In the case shown, the joint is completely filled up with polyurethane filler foam, which is not required, however. Front-side joint edge areas may also remain unfilled on one or both sides. The polyurethane foam cross-links under the influence of moisture. To encourage the cross-linking, the joint may be moistened with water before the foaming using the polyurethane. Excess polyurethane foam is cut away if needed before sealant is sprayed onto the joint between frame 3 and window embrasure 5 from the interior room side (1).

The sealant 11 is an MS polymer based on a silane-modified polyether prepolymer. This polymer also cross-links under the influence of moisture. It is therefore also advisable in this case to moisten the area of the joint onto which the sealant is to be applied before the application of the sealant 11 and possibly also thereafter. After the application of the sealant, its surface may be moistened once again and smoothed if needed. After the cross-linking of the sealant, the production of the joint seal 6 is finished.

The sealant 11, which is typically stored in a hose bag or a cartridge, is expediently applied with the aid of a spray gun. A suitable cartridge gun is shown strongly schematically in FIG. 2. A cartridge 13, which contains the sealant 11, is already chucked in the gun 12. The sealant is metered by pulling the lever on the pistol grip 14. A sheet die 15 is placed on the outlet opening of the cartridge 13 so it is rotatable. The metering of the sealant 11 occurs through the slot 16 of the sheet die 15. The width b of the slot 16 defines the maximum joint width which may be filled using the sealant 11 from the spray gun 12 in one work step.

FIGS. 3 and 4 describe how joints of various widths may be filled with the sealant 11 using the spray gun 12 without having to change the sheet die 15. FIG. 3 illustrates the application of the sealant 11 at maximum width, while FIG. 4 shows the application of the sealant 11 in a lesser width. In the case of FIG. 3, the sheet die 15 is guided over the joint and the insulation material already applied there in such a way that the slot opening is essentially perpendicular to the feed direction, which is indicated by the black arrow. The width b of the slot opening essentially corresponds to the joint width B. The layer thickness at which the sealant 11 is introduced into the joint from the sheet die essentially results from the height of the slot h. For example, h may be 2 mm and b 30 mm.

If a gap width of less than 30 mm is to be filled with sealant, this may also be performed using the same sheet die. For this purpose, the sheet die is rotated on the cartridge in the direction of the arrows shown in FIG. 2. The slot 16 is placed transversely over the gap and assumes an angle other than 90° in relation to the feed direction illustrated by the black arrow. The rotation is performed far enough that the two outer edges of the slot opening 16 come to rest over the edges of the joint of the width B'.

In the following, the present invention is additionally to be explained further on the basis of an example. The example describes a preferred joint seal according to the present invention, without having to be restricted thereto, however, as well as some testing results for this joint seal.

EXAMPLE 1

An attachment joint constructed according to FIG. 1 was produced using the following components:

Insulation material 7: single-component, soft-cell polyurethane filler foam having the following properties:

Composition before the application:

Polyol blend:

| | |
|---|---|
| long-chain polyether polyol | 330 wt.-parts |
| aliphatic polyester polyol | 170 wt.-parts |
| aromatic polyester polyol | 60 wt.-parts |
| short-chain polyether polyol | 80 wt.-parts |
| softener | 330 wt.-parts |
| foaming additive | 30 wt.-parts |
| polyol blend (as above) | 390 wt.-parts |
| crude MDI (diphenylmethane diisocyanate) | 290 wt.-parts |
| propellant | 169 wt.-parts |
| cell composition | fine |
| non-sticky after | 4-8 minutes |
| cuttable after (20 mm strand) | 8-12 minutes |
| cured after (20 mm strand) | approximately 12 hours |
| processing temperature | +5-+25° C. |
| optimum processing temperature | +20° C. |
| tensile strength (DIN 53430) | 5-6 N/cm$^2$ |
| practical elongation (DIN 53430) | 27% |
| shear strength (DIN 54427) | 3-4 N/cm$^2$ |
| compressive stress at 10% compression (DIN 53421) | 1-2 N/cm$^2$ |
| water absorption (DIN 53433) | 1.5 vol.-% |
| thermal conductivity (DIN 52612) | 0.04 W/mK |
| Sd value (DIN EN ISO 12572, cured, 2 mm layer thickness) | 1.2 m |
| temperature resistance (cured, continuous) | −40-+80° C. |
| construction material class (DIN 4102, part 1) | B3 (DE: B2) |

A corresponding polyurethane foam is obtainable from Rathor A G, Appenzell, C H, and from Pichler Chemie, Berghausen, A T, under the name PICHLER CHEMIE® Pistolen-Weichzellschaum (spray gun soft-cell foam).

Sealant 11: single-component, moisture cross-linking, silane-modified polyether prepolymer having the following properties:

| | |
|---|---|
| Solid content | 100% |
| Shore hardness (Shore A according to DIN 5305; cured) | 30 |
| density (EN 542, 20° C.) | 1.4 g/cm$^3$ |
| skin formation after | approximately 10 minutes |
| curing time (20° C., 50% relative ambient humidity, 2 mm bead) | appr. 24 hours |
| practical elongation | 27% |
| elongation at break | 300% |
| restoring capability | 70% |
| breaking strength (ISO 87339, 23° C.) | 0.45 N/mm$^2$ |
| vapor diffusion resistance index | $1.1 \cdot 10^3$ |
| Sd value (DIN EN ISO 12572, cured, 2 mm layer thickness) | 4.2 m |
| temperature resistance | −40-+100° C. |
| minimum processing temperature | +5° C. |

A corresponding silane-modified polyether prepolymer is obtainable from Weiss Chemie+Technik GmbH & Co. KG, Haiger, D E, under the name Cosmosplast® MS 1696.

The joint seal was tested in a window-structure attachment joint for airtightness on the basis of Austrian Standard EN 1026 and Austrian Standard EN 12207 (Austrian Standard B 5300), tightness to driving rain on the basis of Austrian Standard EN 1027 and Austrian Standard EN 12208 (Austrian Standard B 5300), and in regard to previous standard Austrian Standard B 5320 in the versions valid in November 2004.

A wooden frame having the external dimensions 1365×1635 W×H and a thickness of 70 mm was mounted around a single-sash wooden single tilt-turn window having the frame external dimensions of 1225×1475 mm W×H and a window frame thickness of 70 mm in such a way that this wooden frame was externally surface-flush with the window frame. Accordingly, there was a 16 mm vertical and a 26 mm horizontal joint width, and a 70 mm joint depth between the window frame and the wooden frame. The polyurethane filler foam was introduced into this joint.

For this purpose, a container having the polyurethane soft-cell foam was placed on a typical foam gun (for example, Pichler Chemie foam gun PP-65). After the window joint was moistened with water, the window joint was foamed uniformly from bottom to top in the case of the vertical joint. The polyurethane filler foam was introduced into the middle joint area in such a way that the window joint was not completely filled up. The polyurethane filler foam expanded by approximately two to three times after being injected into the joint. Approximately 1 minute after the application of the polyurethane soft-cell foam, water was again sprayed into the window attachment joint and onto the polyurethane foam to even out the curing. 30 minutes later, excess polyurethane foam was removed using a utility knife in such a way that the surface of the filler foam was flush on both sides with the standard frame. Subsequently, an approximately 2 mm thick layer of the sealant was applied using a cartridge extrusion gun onto the polyurethane foam toward the room interior—over the window attachment joint—and subsequently smoothed. After a waiting time of approximately 24 hours, the tests were performed.

The testing stand comprised a vertical testing panel, and vertical and horizontal, fixed and movable lateral walls situated perpendicularly thereto, which formed a box open in front. The testing element was pressed onto the open front side of this box using threaded spindles and compressed air cylinders without deformation. Pressure-controllable air was blown into the box through an opening introduced on the rear side using a radial fan or compressors to test the air permeability, the behavior under wind strain, and the tightness to driving rain. In accordance with Austrian Standard EN 1027, parallel spray tubes equipped with solid ball nozzles were attached in the box for testing the tightness to driving rain. The testing pressure differential in relation to the atmospheric air pressure was measured using capsule element pressure gauges. Air and water quantities were measured using floating ball measuring cylinders.

Testing of the Airtightness

The testing of the airtightness was performed according to Austrian Standard EN 1026. Before the airtightness was tested, the window was sealed on its exterior side facing toward the testing stand using a polyethylene film and adhesive tape up to the frame external edge and simultaneously sealed on the interior over the structural attachment joint using a polyethylene film and adhesive tape. A measurement of the airtightness in this state results in the air passage through the leaks of the testing stand and the clamping. Subsequently, the polyethylene film was removed on the interior and the airtightness was measured according to Austrian Standard B 5300, strain class 4. The air passage through the leaks of the testing stand and the internal clamping was subtracted from the measured values obtained in this way. The strain class achieved according to Austrian Standard EN 12207 results from the comparison of the most unfavorable measured values of the length-related airtightness to the boundary curve for the strain classes.

Testing of the Tightness to Driving Rain

The testing element was impinged with a closed water film in accordance with Austrian Standard EN 1027. During the spraying, the testing element was additionally loaded using a static air pressure rising step-by-step corresponding to the testing plan according to Austrian Standard EN 1027. The time of a possible water exit on the room side and the associated pressure step according to Austrian Standard B 5300 resulted in the strain class achieved according to Austrian Standard EN 12208.

Test Results

The testing results are summarized in Table 1.

TABLE 1

Achieved strain classes according to Austrian Standard EN 12207 and Austrian Standard EN 12208 and/or requirement of Austrian Standard V 5320

| Testing criteria | Single classification |
|---|---|
| Air permeability of the structural attachment joint (≤600 Pa) | 4* |
| Tightness to driving rain 9A of the structural attachment joint (≤600 Pa) | 9A |

*measurement result: no air permeability

Testing of the Noise Damping

The noise damping was determined according to DIN EN ISO 717-1. A maximum noise damping $R'_W$ of 63 dB resulted for the system made of insulation material and sealant. The joint noise damping $R'_W$ at a joint width of 10 mm was 62 dB, and 61 dB at a joint width of 20 mm.

Testing for Organic Halogen Compounds

The insulation material was tested for a possible content of extractable organic halogen compounds. For this purpose, the material was first cleaned on silica gel and subsequently extracted using ethyl acetate. The extract was combusted in the oxygen stream and the halogen content was determined using microcolorimetry. The results were below the detection limit of 10 mg/kg. The insulation material is thus free of extractable organic halogen compounds.

The invention claimed is:

1. A joint seal for sealing a component joint, which comprises an insulation material in an internal joint area and a sealing material in at least a front-side joint edge area, wherein the insulation material is in a form of a single layer of polyurethane foam comprising a single-component, moisture cross-linking, elastic, predominantly closed-cell soft-cell foam having a closed cell proportion of at least 90%, and having been foamed in situ so as to have expanded in the internal joint area to contact surfaces of the joint area, wherein the sealing material comprises a sealant, which is vapor-diffusion tight, directly adjoins the insulation material, is single-component, moisture cross-linked, and sprayable before the curing, the sealing material having been cured in situ against the insulation material, and bonded directly to the polyurethane foam so as to attach components of the joint area to one another, and wherein the sealing material is a silyl-terminated polymer, and has an elasticity which is greater than that of the insulation material.

2. The joint seal according to claim 1, wherein the sealant has a Shore A hardness (DIN 5305) in the range from 10 to 60 in the cured state.

3. The joint seal according to claim 1, wherein the sealant is essentially free of organic solvents in its sprayable state.

4. The joint seal according to claim 1, wherein the silyl-terminated polymer is one which cross-links under the influence of moisture.

5. The joint seal according to claim 1, wherein the sealant has at least one of the following properties:

an elongation at break (DIN 53430) of at least 200%, a water vapor diffusion resistance index of at least 900, an Sd value of at least 1.8 m at a layer thickness of 2 mm of the cured sealant.

6. The joint seal according to claim 1, wherein the polyurethane foam has at least one of the following properties:

in the testing of the air permeability according to standard EN 1026: airtight up to 300 Pa, in the testing of the tightness to driving rain according to standard EN 1027: no water entry up to 300 Pa, a breaking elongation (DIN 53430) of at least 15%, a thermal conductivity (DIN 52612) of at most 0.1 W/mK.

7. The joint seal according to claim 1, wherein the seal is configured for attachment to one of a structural body, a door, window frame and a roller shutter box.

8. The joint seal according to claim 1, wherein the sealant is provided on only a side of the insulation material facing the front-side joint edge area.

9. The joint seal according to claim 8, wherein the sealant is provided on a side of the insulation material which, in use, is on a side of the joint directed toward an interior room.

10. The joint seal according to claim 9, wherein the sealant is provided to form a seal over the entire length of the component joint.

* * * * *